United States Patent
Carlson et al.

(10) Patent No.: US 7,378,476 B2
(45) Date of Patent: May 27, 2008

(54) OLEFIN POLYMERIZATION PROCESS IN THE PRESENCE OF A RADICAL GENERATING SYSTEM

(75) Inventors: Norman W. Carlson, Batavia, IL (US); Chi-Hung Lin, Cockeysville, IL (US); Jerome A. Streeky, Bolingbrook, IL (US); Carl Towner, Albuquerque, NM (US); Barry F. Wood, Naperville, IL (US)

(73) Assignee: Ineos USA LLC, Lisle, IL (US)

( * ) Notice: Subject to any disclaimer, the term of this patent is extended or adjusted under 35 U.S.C. 154(b) by 427 days.

(21) Appl. No.: 11/147,530

(22) Filed: Jun. 8, 2005

(65) Prior Publication Data
US 2005/0288463 A1 Dec. 29, 2005

Related U.S. Application Data

(60) Provisional application No. 60/583,154, filed on Jun. 25, 2004.

(51) Int. Cl.
*C08F 4/28* (2006.01)
(52) U.S. Cl. .............. 526/227; 526/348; 526/160; 526/943; 526/124.2; 526/124.3; 526/219.6
(58) Field of Classification Search ............ 526/348, 526/160, 943, 227, 124.2, 124.3, 219.6
See application file for complete search history.

(56) References Cited

U.S. PATENT DOCUMENTS

| | | | |
|---|---|---|---|
| 5,416,169 A | 5/1995 | Saito et al. | |
| 5,554,668 A | 9/1996 | Scheve et al. | |
| 5,605,936 A | 2/1997 | DeNicola, Jr. et al. | |
| 6,103,833 A | 8/2000 | Hogt et al. | |
| 6,184,327 B1 | 2/2001 | Weng et al. | |
| 6,323,289 B1 | 11/2001 | Hogt et al. | |
| 6,423,793 B1 | 7/2002 | Weng et al. | |
| 6,608,152 B2 * | 8/2003 | Ford et al. .............. 526/138 |
| 6,620,892 B1 | 9/2003 | Bertin et al. | |
| 6,885,415 B2 * | 4/2005 | Kuroda et al. ........... 349/96 |

OTHER PUBLICATIONS

Rätzsch et al., Radical reactions on polypropylene in the solid state, Prog. Polym. Sci., vol. 27, 2002, pp. 1195-1282.

* cited by examiner

*Primary Examiner*—Ling-Sui Choi
(74) *Attorney, Agent, or Firm*—David P. Yusko; James J. Drake

(57) ABSTRACT

An olefin polymerization process comprises gas-phase polymerization of at least one olefin monomer in a reactor using a Ziegler-Natta or metallocene catalyst system in the presence of at least one suitable radical-generating compound in an amount sufficient for polymer modification and subsequent stabilization of such compound and generated radicals before post-reactor heat processing.

15 Claims, No Drawings

OLEFIN POLYMERIZATION PROCESS IN THE PRESENCE OF A RADICAL GENERATING SYSTEM

CROSS-REFERENCE TO RELATED APPLICATIONS

This application claims the benefit of U.S. Provisional Application No. 60/583,154 filed Jun. 25, 2004, which is incorporated by reference herein.

BACKGROUND OF THE INVENTION

This invention relates to polymerization of olefins and particularly relates to Ziegler-Natta or metallocene catalyzed gas-phase polymerization of olefins including alpha-olefins and ethylene in the presence of a radical generating compound.

Ziegler-Natta and metallocene catalyzed olefin polymerization in the gas phase now is well-known in the art. Known gas-phase processes include horizontally and vertically stirred sub-fluidized bed reactor systems, fluidized bed systems, as well as multi-zone circulating reactor systems in which, typically, a fluidized zone is combined with a slower moving reactive zone, such as described in U.S. Pat. No. 6,689,845 incorporated by reference herein. These systems have been used to polymerize ethylene and $C_3$-$C_{10}^+$ alpha olefins as homopolymers or copolymers. Typically, olefin polymers formed in the gas phase are polyethylene, polypropylene, copolymers of ethylene and $C_3$-$C_{10}^+$ olefin monomers, and copolymers of propylene with ethylene and $C_4^+$ olefin monomers either as statistical (random) copolymers or multi-phasic (rubber-modified or impact) copolymers.

Post-polymerization reactor modification of olefin polymers with free radical generating species, such as organic peroxides, also is well known in the art. Typically, such modification is performed in an extruder in which formed polymer is melted by mechanical or external heating, extruded through strand dies, and chopped into discrete pellets. Post reactor modification is used in polyethylene to introduce crosslinks among polymer chains to increase molecular weight and modify polymer properties. In propylene polymers, post-reactor extruder modification with peroxides is used to decrease polymer molecular weight through chain scission or cleaving, thereby producing, "controlled rheology" product.

Properties of substantially linear olefin polymers are known to be altered by creating branching of the linear chain or attaching hydrocarbon moieties along the linear chain, although actual formation of such branched linear olefin polymers may be difficult to control, especially in a continuous reactor produced polymer. This invention provides a practical method of producing branched olefin polymers in a continuous gas-phase reactor system.

High melt strength propylene polymers are discussed by Rätzsch et al., Progress in Polymer Science, 27 (2002) 1195-1282, incorporated by reference herein. Post-reactor processing in an extruder with certain peroxides to produce high melt strength propylene polymers is described in U.S. Pat. Nos. 6,103,833, 6,323,289, 6,620,892, and 5,416,169. For this method, extruder conditions are generally set at lower temperatures when compared to normal extrusion processes. The lower extruder temperature typically results in a greater power demand for mixing this material. Therefore, production of high melt strength polymer via this peroxide method will result in higher energy costs, in addition to the added costs for the special peroxide.

In some polyolefins, such as propylene polymers, there is a need in certain uses for a polymer with increased melt strength. For example, higher melt strength is needed for propylene polymers used in thermoforming applications. Current techniques to produce these types of materials employ expensive post reactor processing such as electron beam treatment, as discussed in U.S. Pat. Nos. 5,554,668 and 5,605,936, and processing with special peroxides under controlled conditions as mentioned above. Other approaches to branched propylene polymers use macromonomers as described in U.S. Pat. Nos. 6,184,327 and 6,423,793.

However there is a need for efficient direct reactor formation of branched polyolefins, such as branched propylene polymers, without use of post-reactor peroxide treatment or use of specially prepared macromonomers.

SUMMARY OF THE INVENTION

An olefin polymerization process comprises gas-phase polymerization of at least one olefin monomer in a reactor using a Ziegler-Natta or metallocene catalyst system in the presence of at least one suitable radical-generating compound in an amount sufficient for polymer modification and subsequent stabilization of such compound and generated radicals before post-reactor heat processing.

DESCRIPTION OF THE INVENTION

In the process of this invention, olefin monomer is polymerized in the gas phase using a Ziegler-Natta or metallocene catalyst system in the presence of a suitable radical-generating compound. With suitable reactor and post-reactor conditions, this method produces olefin polymers with properties consistent with branched or long chain branched polyolefins. Among possible polymer modifications is production of olefin polymer, especially propylene polymer, with higher melt strength than would be produced without such modifications.

In one aspect of this invention, a radical-generating compound is added to an olefin polymerization gas-phase reactor. Such compound is selected to form suitably stable free radical species within the polymerization zone. In the sense used in describing this invention, radicals (sometimes called free radicals) are uncharged chemical species with at least one unpaired electron. A typical radical generating compound is an organic peroxide such as di-tert-amylperoxide, t-butylperoxy-2-ethoxyhexylcarbonate, and 2,5-dimethyl-2, 5-di(t-butylperoxy)-3-hexyne. Thus, an organic peroxide represented as R—O—O—R' forms free radicals of the form, R—O—, in which R is a carbon-containing moiety. Typically R and R' (which usually are the same, but may be different) are hydrocarbon structures containing at least 1, preferably at least about 3, carbon atoms and may contain up to 30 or more, preferably up to about 20, carbon atoms. The lifetime of such radical species must be sufficiently long to permit reaction with a forming polymer chain, but preferably should not be so long as to remain active in post reactor processing.

Other examples of peroxide radical-generating compounds include di-tert-butyl peroxide; tert-butyl cumyl peroxide; tert-amylperoxy benzoate; tert-butylperoxy-3,5,5-trimethylhexanoate; tert-butylperoxy-2-ethylhexanoate; tert-amylperoxy-2-ethylhexanoate; Triganox ADC™ from Akzo Nobel (a mixture of peroxydicarbonates); 2,5-bis(tert-butylperoxy)-2,5-dimethylhexane; dicumyl peroxide; 2,2-di(tert-butylperoxy)butane; tert-amylperoxy-2-ethylhexylcarbonate; and tert-butylperoxy-2-ethylhexylcarbonate.

Other radical generating compounds include azo compounds that will form carbon radicals upon elimination of dinitrogen ($N_2$). These compounds include 2,2'-azobis (isobutyronitrile) and 2,2'-azobis(2-methylbutyronitrile). Also useful are suitable alkoxyamine species which generate an alkyl radical and a nitroxide radical species and stable nitroxide species such as 2,2',6,6'-tetramethylpiperidinyloxy (TEMPO).

Free radicals typically are known to be unstable in the long term and will react with a variety of molecular compounds. Although unstable in the long term, suitable generated radicals useful in this invention possess a sufficient lifetime to permit reaction with a forming polymer chain within the polymerization reactor. Without being held to a specific theory, this suggests sufficient lifetime from radical formation to permit diffusion to a site on a polymer chain. Further, such radical may react with a formed polymer chain or a chain undergoing polymerization growth around a catalytic site.

A convenient method to classify radical-generating compounds based upon reactivity measures the temperature at which the half-life of the radical generating species is one hour ($T_h$). The half-life is the time required to reduce the original radical generating species concentration by 50%. A lower temperature at which the half-life of the radical generating species is one hour means the peroxide is more reactive. Conversely, a higher temperature at which the half-life of the radical generating species is one hour means the peroxide is less reactive.

Radical generating compounds useful in this invention may have broad range of $T_h$ and may extend from ambient temperature to 250° C. or above depending upon the reactivity of the polymerization system. Convenient suitable compounds may have a $T_h$ of greater than 30° C., and typically at least 75° C., and may extend up to 150° C. or above. Suitable radical generating compounds useful in this invention have a half-life of at least about an hour at the olefin polymerization temperature selected.

The one-hour half life temperatures for compounds used in the examples are:

| Radical Generating Compound | $T_h$ (° C.) |
| --- | --- |
| 2,2'-Azobis(isobutyronitrile) | 82 |
| t-butylperoxy-2-ethylhexylcarbonate | 117 |
| di-tert-amyl peroxide | 128 |
| 2,5-dimethyl-2,5-di(t-butylperoxy)-3-hexyne | 141 |

The amount of radical generating compound added to a polymerization reactor should be sufficient to permit desired chemical reactions along the polymer chains. Preferably, an excess amount of radical generating compound is avoided, which would require an extensive stabilization procedure prior to post-reactor heat processing, such as melting in an extruder.

Typically, the molar ratio P/M (wherein P is the molar amount of radical generating compound and M is the atomic amount of transition metal within the catalyst component) is at least 0.01 and usually is above about 0.1. Typical preferable P/M molar ratios are at least 0.5. Because use of such radical generating species adds cost to a process and may decrease catalyst activity, a minimally acceptable amount of such compound preferably is selected. A useful P/M ratio may be up to about 100 or above with a preferable amount of up to about 50. A preferable P/M is about 1 to about 40 and more preferably about 5 to about 25.

Preferably, a radical generating compound useful in this invention is a liquid or solid, which is at least partially soluble in a liquid hydrocarbon such as hexane.

In the method of this invention, at least one radical-generating compound is added to a reactor during polymerization of at least one olefin using a Ziegler-Natta or metallocene catalyst system under suitable conditions.

In one aspect of this invention, a Ziegler-Natta catalyst system is used to polymerize alpha-olefins. Typical Ziegler-Natta catalyst systems contain a transition-metal (typically IUPAC a Group 4-6 metal) component, preferably a titanium-containing component, together with an organometallic compound such as an aluminum alkyl species. A typical and preferable titanium-containing component is a titanium halide compound, based on titanium tetrahalide or titanium trihalide, which may be supported or combined with other material. These systems are now well-known in the art.

For polymerization of olefins, high activity supported (HAC) titanium-containing components useful in this invention typically are supported on hydrocarbon-insoluble, magnesium-containing compounds. For polymerization of alpha-olefins such as propylene a solid transition metal component typically also contains an electron donor compound to promote stereospecificity. Such supported titanium-containing olefin polymerization catalyst component typically is formed by reacting a titanium (IV) halide, an organic electron donor compound and a magnesium-containing compound. Optionally, such supported titanium-containing reaction product may be further treated or modified by further chemical treatment with additional electron donor or Lewis acid species.

Suitable magnesium-containing compounds include magnesium halides; a reaction product of a magnesium halide such as magnesium chloride or magnesium bromide with an organic compound, such as an alcohol or an organic acid ester, or with an organometallic compound of metals of Groups 1, 2, or 13; magnesium alcoholates; or magnesium alkyls.

Examples of supported catalysts are prepared by reacting a magnesium chloride, alkoxy magnesium chloride or aryloxy magnesium chloride with a titanium halide, such as titanium tetrachloride, and further incorporation of an electron donor compound. In a preferable preparation, the magnesium-containing compound is dissolved, or is in a slurry, in a compatible liquid medium, such as a hydrocarbon to produce suitable catalyst component particles. Ethylene polymerization catalysts also may be supported on oxides such as silica, alumina, or silica alumina.

The possible solid catalyst components listed above only are illustrative of many possible solid, magnesium-containing, titanium halide-based, hydrocarbon-insoluble catalyst components useful in this invention and known to the art. This invention is not limited to a specific supported catalyst component.

In a typical supported catalyst of this invention, the magnesium to titanium atom ratio is above about 1 to 1 and may range to about 30 to 1. More preferably, the magnesium to titanium ratio ranges from about 10:1 to about 20:1. The internal electron donor components typically are incorporated into the solid, supported catalyst component in a total amount ranging up to about 1 mole per gram atom of titanium in the titanium compound, and preferably from about 0.5 to about 2.0 mole per gram atom of titanium in the titanium compound. Typical amounts of internal donor are at least 0.01 mole per gram atom of titanium, preferably above about 0.05 and typically above about 0.1 mole per gram atom of titanium. Also, typically, the amount of internal donor is less than 1 mole per gram atom of titanium, and typically below about 0.5 mole per gram atom of titanium.

The internal electron donor materials which may be useful in this invention are incorporated into a solid, supported catalyst component during formation of such component. Typically, such electron donor material is added with, or in a separate step, during treatment of a solid magnesium-containing material with a titanium (IV) compound. Most typically, a solution of titanium tetrachloride and the internal electron donor modifier material is contacted with a magnesium-containing material. Such magnesium-containing material typically is in the form of discrete particles and may contain other materials such as transition metals and organic compounds.

Preferred electron donor compounds include esters of aromatic acids. organic Electron donors of mono- and dicarboxylic acids and halogen, hydroxyl, oxo-, alkyl-, alkoxy-, aryl-, and aryloxy-substituted aromatic mono- and dicarboxylic acids are preferred. Among these, the alkyl esters of benzoic and halobenzoic acids wherein the alkyl group contains 1 to about 6 carbon atoms, such as methyl benzoate, methyl bromobenzoate, ethyl benzoate, ethyl chlorobenzoate, ethyl bromobenzoate, butyl benzoate, isobutyl benzoate, hexyl benzoate, and cyclohexyl benzoate, are preferred. Other preferable esters include ethyl p-anisate and methyl p-toluate. An especially preferred aromatic ester is a dialkylphthalate ester in which the alkyl group contains from about two to about ten carbon atoms. Examples of preferred phthalate ester are diisobutylphthalate, diethylphthalate, ethylbutylphthalate and d-n-butylphthalate. Other useful internal donors are substituted diether compounds, esters of substituted succinic acid, substituted glutaric acid, substituted malonic acid, and substituted fumaric or maleic acids.

Typically, the catalyst or catalyst component of this invention is used in conjunction with an organometallic cocatalyst component including a Group 2 or 13 metal alkyl and, typically, one or more modifier compounds. Useful Group 2 or 13 metal alkyls are compounds of the formula $MR_m$ wherein M is a Group 2 or 13 metal, each R is independently an alkyl radical of 1 to about 20 carbon atoms, and m corresponds to the valence of M. Examples of useful metals, M, include magnesium, calcium, zinc, cadmium, aluminum, and gallium. Examples of suitable alkyl radicals, R, include methyl, ethyl, butyl, hexyl, decyl, tetradecyl, and eicosyl. Aluminum alkyls are preferred and most preferably trialkylaluminums containing 1 to about 6 carbon atoms per alkyl radical, and particularly triethylaluminum and triisobutylaluminum or a combination thereof are used.

If desired, metal alkyls having one or more halogen or hydride groups can be employed, such as ethylaluminum dichloride, diethylaluminum chloride, diethylaluminum hydride, diisobutylaluminum hydride, and the like.

To optimize the activity and stereospecificity of this cocatalyst system in alpha-olefin polymerization, it is preferred to employ one or more external modifiers, typically electron donors, such as silanes, mineral acids, organometallic chalcogenide derivatives of hydrogen sulfide, organic acids, organic acid esters and mixtures thereof.

Organic electron donors useful as external modifiers for the aforesaid cocatalyst system are organic compounds containing oxygen, silicon, nitrogen, sulfur, and/or phosphorus. Such compounds include organic acids, organic acid anhydrides, organic acid esters, alcohols, ethers, aldehydes, ketones, silanes, amines, amine oxides, amides, thiols, various phosphorus acid esters and amides, and the like. Mixtures of organic electron donors also may be used.

The aforesaid cocatalyst system advantageously and preferably contains an aliphatic or aromatic silane external modifier. Preferable silanes useful in the aforesaid cocatalyst system include alkyl-, aryl-, and/or alkoxy-substituted silanes containing hydrocarbon moieties with 1 to about 20 carbon atoms. Especially preferred are silanes having a formula: $SiY_4$, wherein each Y group is the same or different and is an alkyl or alkoxy group containing 1 to about 20 carbon atoms. Preferred silanes include isobutyltrimethoxysilane, diisobutyldimethoxysilane, diisopropyldimethoxysilane, n-propyltriethoxysilane, isobutylmethyldimethoxysilane, isobutylisopropyldimethoxysilane, dicyclopentyldimethoxysilane, tetraethylorthosilicate, dicyclohexyldimethoxysilane, diphenyldimethoxysilane, di-t-butyidimethoxysilane, t-butyltrimethoxysilane, and cyclohexylmethyldimethoxysilane. Mixtures of silanes may be used.

A typical catalyst system for the polymerization or copolymerization of alpha olefins is formed by combining the supported titanium-containing catalyst or catalyst component of this invention and an alkyl aluminum compound as a co-catalyst, together with at least one external modifier which typically is an electron donor and, preferably, is a silane. Typically, useful aluminum-to-titanium atomic ratios in such catalyst systems are about 10 to about 500 and preferably about 30 to about 300. Typical aluminum-to-electron donor molar ratios in such catalyst systems are about 2 to about 60. Typical aluminum-to-silane compound molar ratios in such catalyst systems are above about 2, preferably above 2.5 and more preferably about 3. This ratio may range up to 200, and typically ranges to about 150 and preferably does not exceed 120. A typical range is about 3 to about 20.

In one aspect of this invention the substituted cycloalkane dicarboxylates identified above as catalyst component internal donors may be used as external donors alone or in combination with other suitable external donors including the above-identified silane compounds.

The amount of the Ziegler-Natta catalyst or catalyst component of this invention to be used varies depending on choice of polymerization or copolymerization technique, reactor size, monomer to be polymerized or copolymerized, and other factors known to persons of skill in the art, and can be determined on the basis of the examples appearing hereinafter. Typically, a catalyst or catalyst component of this invention is used in amounts ranging from about 0.2 to 0.02 milligrams of catalyst to gram of polymer or copolymer produced.

A metallocene catalyst system typically useful in this invention incorporates a transition metal containing metallocene component in combination with a non-coordinating anion. A source of a non-coordinating anion typically is a salt of the non-coordinating anion and a compatible cation which has either an active proton or its equivalent such as a Lewis acid capable of extracting an anion, such as derived from aluminoxanes or boranes.

The transition metal-containing component of the metallocene catalyst systems useful in this invention is based on transition metal arene complexes referred to as metallocenes in which typically, a Group 4, 5, or 6 transition metal is complexed with one or more cyclopentadienyl moieties together with one or more other ligands. In metallocene components typically useful in this invention, cyclopentadiene or a substituted cyclopentadiene is complexed with a transition metal which preferably is a Group 4 metal such as titanium, zirconium or hafnium. Also typical are bridged metallocene compounds in which two cyclopentadiene moieties are structurally joined by a bridging group such as a hydrocarbyl or silyl radical.

Suitable metallocenes useful in this invention include those having a formula $Z_m CP_n Y_{4-n} M$, wherein CP is cyclopentadienyl a substituted cyclopentadienyl; Y is a $C_1$-$C_{20}$ hydrocarbon radical such as alkyl, aryl, alkenyl, alkylaryl, or arylalkyl radical or a halogen; Z is a bridging group between the CP's; n is 1 or 2; and m is 0 or 1, provided that if n=1, m=0.

More particularly, suitable metallocenes of this invention include those having a formula $ZCP_2 Y_1 Y_2$ wherein CP is cyclopentadienyl or a substituted cyclopentadienyl, $Y_1$ and $Y_2$ may be the same or different and may be an alkyl, aryl, alkenyl, arylalkyl, or alkylaryl group or a halogen, Z is a bridging group between the Cp's.

A typical bridged biscyclopentadienyl complex useful in this invention may be represented as:

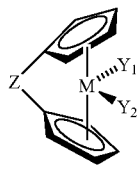

wherein $Y_1$ and $Y_2 = C_1-C_{20}$ hydrocarbyl or silahydrocarbyl radicals or halogen; M=Ti, Zr, or Hf; Z=a $C_1-C_6$ hydrocarbyl, silahydrocarbyl, or silyl bridge radical; and the cyclopentadienyls may be substituted with hydrogen, halogens, or $C_1-C_{20}$ hydrocarbon or silahydrocarbyl radicals and may be multi-ring including substituted indenyl.

The bridging radical, Z, typically contains 1 to about 5 carbon or silicon atoms in the bridging chain structure, which may be substituted further with $C_1-C_6$ hydrocarbon or $C_1-C_6/Si_1-Si_3$ silahydrocarbon. Typical bridging radicals include ethylene, propylene, trimethylene, vinylene, and $SiR_2$, wherein R is a $C_1-C_8$ hydrocarbon group such as methyl, ethyl, propyl, or phenyl. Preferable bridging radicals include dimethylsilyl, diphenylsilyl, and ethylene.

The ligands, $Y_1$ and $Y_2$, attached to the transition metal include $C_1-C_{20}$ hydrocarbyl or silahydrocarbyl radicals and halogens such as chloride, fluoride, or bromide. Typical radicals are $C_1-C_{12}$ hydrocarbyl radicals including methyl, ethyl, propyl, isopropyl, butyl, isobutyl, isopentyl and the like. Preferable ligands include methyl and chloride.

The cyclopentadienyls (Cp's) useful in this invention may be substituted with $C_1-C_{20}$ hydrocarbyl or silahydrocarbyl groups or halogens and may contain multi-ring systems such as indenyls. Hydrocarbyl groups include alkyl, aryl, alkenyl, arylalkyl, and alkylaryl radicals. Typical substituent groups include methyl, ethyl, propyl, isopropyl, butyl, isobutyl, isopentyl and the like. Preferable substituents include trimethylsilyl and $C_1-C_4$ lower alkyls, and the most preferable is methyl.

Other examples of a bridged cyclopentadienyl metallocene component useful in this invention include structures similar to:

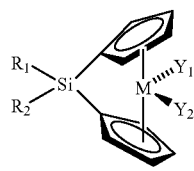

wherein $R_1$ and $R_2$ are $C_1-C_8$ hydrocarbyl groups, including alkyls and aryls; $Y_1$, $Y_2$ and M are defined as above; and the cyclopentadienyl moieties can be substituted with $C_1-C_{20}$ hydrocarbyl or silahydrocarbyl radicals, multi-ring, halogens, or hydrogen.

Specific examples of a bridged cyclopentadienyl metallocene component useful in this invention include structures similar to:

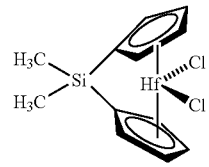

wherein the cyclopentadienyl moieties can be substituted with $C_1-C_{20}$ hydrocarbyl or silahydrocarbyl radicals, multi-ring, halogens, or hydrogen.

Specific examples of a suitable metallocene component include {bis(2,3,5-trimethylcyclopentadienyl) dimethylsilane}hafnium dichloride, {bis(2,4-dimethylcyclopentadienyl)dimethylsilane}hafnium dichloride, {bis(2-methyl-4-t-butylcyclopentadienyl)dimethylsilane}hafnium dichloride, and their respective zirconium analogues.

Other examples of suitable cyclopentadienyl complexes are bridged indenyl structures such as {bis(indenyl) ethane}zirconium dichloride:

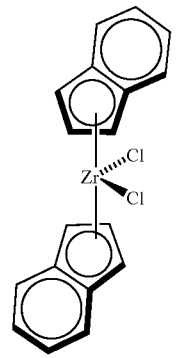

Indenyl-based metallocenes used in this invention typically may be substituted with $C_1-C_{20}$ hydrocarbyl or silahydrocarbyl groups, halogens, or hydrogen. Preferable substituents include aryl and $C_1-C_4$ lower alkyls, and most preferably, are methyl, ethyl, and phenyl. Examples of indenyl-based metallocenes include {bis(2-methylindenyl) dimethylsilane}zirconium dichloride and {bis(2-alkyl-4-arylindenyl)-dimethylsilane}zirconium dichloride and their hafnium analogs. Further substitution on the 4-aryl substituent also is possible (cf. U.S. Pat. No. 6,342,566).

Anions especially useful in the metallocene catalyst systems of this invention are derived from salts of compatible cations and non-coordinating anions such as borates and, typically, include bulky borate anions such as anilinium salts of perfluorophenylborate. Compatible cations have either active protons or their equivalent such as a Lewis acid capable of extracting an anion. Compatible cations include tetraethylammonium, N,N-dimethylanilinium, and triphenylcarbenium. Suitable anions include tetra(hydrocarbyl) derivatives of boron and aluminum, such as tetraphenylborate, tetrakis{3,5-bis(trifluoromethyl)phenyl}borate, tetrakis-(pentafluorophenyl)borate, and tetrakis(pentafluorophenyl)aluminate. A specific example is derived from dimethylanilinium perfluorophenylborate. Other examples of suitable species are listed in EP 0 277 004, incorporated by reference herein.

Triisobutylaluminum (TIBA) may be effective in promoting increased activity in metallocene/borate catalyst systems used in homogeneous polymerizations. Other possible aluminum alkyls include $C_3$-$C_6$ trialkylaluminum compounds such as tri-s-butylaluminum, tri-t-butylaluminum, tri-isopentylaluminum, isopropyl-diisobutylaluminum, and the like.

Although not preferred in all applications, the TIBA/ borate system may incorporate other materials such as aluminoxanes and boranes.

The amount of catalyst to be employed varies depending on choice of polymerization technique, reactor size, monomer to be polymerized, and other factors known to persons of skill in the art, and can be determined on the basis of the examples appearing hereinafter and routine experimentation. Typically the metallocene catalyst component of this invention is used in amounts ranging from about 0.0001 to 10 milligrams, preferably about 0.1 to about 0.001 milligrams, of catalyst to gram of polymer produced.

The molar ratio of non-coordinating (such as borate) anion to transition metal typically ranges from about 0.1 to about 100 and preferably ranges from about 1 to about 20.

The molar ratio of aluminum alkyl/transition metal typically ranges from about 10 to 10000, preferably ranges from about 50 to about 1000, and more preferably ranges from about 100 to about 600. Increased activity is observed if the aluminum/transition metal (Al/M) ratio is controlled to a minimal level within the effective range of Al/M ratios. The optimal ratio may be determined by routine experimentation by those skilled in the art.

Aluminoxanes are oligomeric aluminum/oxygen-containing compounds containing the structure:

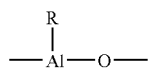

wherein R is a suitable alkyl or aryl substituent group.

More specifically, aluminoxanes are represented as linear or cyclic compounds with structures:

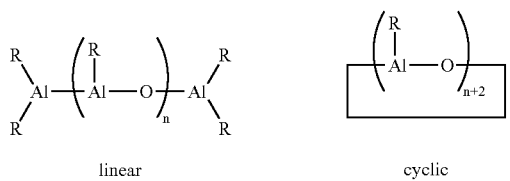

linear                      cyclic wherein R is a $C_1$-$C_5$ alkyl group and n=2 to about 20.

R is preferably methyl or ethyl and n preferably equals about 5 to about 15 and the most typical aluminoxane is methylaluminoxane wherein n is about 10.

Typically, mixtures of linear and cyclic aluminoxanes are prepared by reacting an aluminum trialkyl with water in a suitable organic solvent such as toluene. In one suitable method, a solution of trimethyl aluminum in toluene is reacted with the water of hydration of copper sulfate pentahydrate. Methods to prepare aluminoxanes are described in U.S. Pat. Nos. 4,542,199, 4,544,762, and 4,665,047, all incorporated by reference herein.

Typical conventional catalyst compositions have been formed by combining the transition metal metallocene compound and an aluminoxane compound with typical aluminum-to-transition metal atomic ratios of about 10 to about 10,000 and preferably about 100 to about 1000.

The process of this invention is useful in polymerization or copolymerization of ethylene and alpha-olefins containing 3 or more carbon atoms such as propylene, butene-1, pentene-1,4-methylpentene-1, and hexene-1, as well as mixtures thereof and mixtures thereof with ethylene. Typical olefin monomers include up to $C_{14}$ alpha-olefins, preferably up to $C_8$ alpha-olefins, and more preferably up to $C_6$ alpha-olefins. The process of this invention is particularly effective in the stereospecific polymerization or copolymerization of propylene or mixtures thereof with up to about 30 mol percent ethylene or a higher alpha-olefin. According to the invention, branched crystalline polyolefin homopolymers or copolymers are prepared by contacting at least one alpha-olefin with an above-described catalyst or catalyst component with a radical generating compound under suitable polymerization or copolymerization conditions. Such conditions include polymerization or copolymerization temperature and time, pressure(s) of the monomer(s), avoidance of contamination of catalyst, the use of additives to control homopolymer or copolymer molecular weights, and other conditions well known to persons skilled in the art.

Irrespective of the polymerization or copolymerization process employed, polymerization or copolymerization should be carried out at temperatures sufficiently high to ensure reasonable polymerization or copolymerization rates and avoid unduly long reactor residence times, but not so high as to result in the production of unreasonably high levels of stereorandom products due to excessively rapid polymerization or copolymerization rates. Generally, temperatures range from about 0° to about 120° C. with a range of from about 20° C. to about 95° C. being preferred from the standpoint of attaining good catalyst performance and high production rates.

More preferably, polymerization according to this invention is carried out at temperatures ranging from about 50° C. to about 80° C.

Olefin polymerization or copolymerization according to this invention is carried out at monomer pressures of about atmospheric or above. Generally, monomer pressures range from about 20 to about 600 psi (140 to 4100 kPa), although in vapor phase polymerizations or copolymerizations, monomer pressures should not be below the vapor pressure at the polymerization or copolymerization temperature of the alpha-olefin to be polymerized or copolymerized.

The polymerization or copolymerization time will generally range from about ½ to several hours in batch processes with corresponding average residence times in continuous processes. Polymerization or copolymerization times ranging from about 1 to about 4 hours are typical in autoclave-type reactions.

Prepolymerization or encapsulation of the catalyst or catalyst component of this invention also may be carried out prior to being used in the polymerization or copolymerization of alpha olefins. A particularly useful prepolymerization procedure is described in U.S. Pat. No. 4,579,836, which is incorporated herein by reference.

Examples of gas-phase polymerization or copolymerization processes in which the catalyst or catalyst component of this invention is useful include both stirred bed reactors and fluidized bed reactor systems and are described in U.S. Pat. Nos. 3,957,448; 3,965,083; 3,971,786; 3,970,611; 4,129, 701; 4,101,289; 3,652,527; 4,003,712; 4,535,134; 4,640, 963; 6,350,054; 6,590,131; and EP 0 855 411, all incorporated by reference herein. Typical gas phase olefin polymerization or copolymerization reactor systems comprise at least one reactor vessel to which olefin monomer and catalyst components can be added and which contain an agitated bed of forming polymer particles. Typically, catalyst components are added together or separately through one or more valve-controlled ports in the single or first reactor vessel. Olefin monomer, typically, is provided to the reactor through a recycle gas system in which unreacted monomer removed as off-gas and fresh feed monomer are mixed and injected into the reactor vessel. For production of impact copolymers, homopolymer formed from the first monomer in the first reactor is reacted with the second monomer in the second reactor. A quench liquid, which can be liquid monomer, can be added to polymerizing or copolymerizing olefin through the recycle gas system in order to control temperature.

The radical generating compound used in this invention typically may be added directly to a polymerization reactor through an input port. Typically, the compound is contained in a suitable diluent such as hexane and injected separately from the catalyst components. Such separate addition is preferred to avoid premature deactivation of the catalyst system.

In order to avoid post-reactor reaction of organic radicals with formed polymer, preferably, organic radicals or radical generating compounds are rendered suitably inactive or stabilized before polymer is subjected to post-reactor heating, such as in extrusion.

Irrespective of polymerization or copolymerization technique, polymerization or copolymerization advantageously is carried out under conditions that exclude oxygen, water, and other materials that act as catalyst poisons, except for the controlled amount of radical generating compounds used in this invention. Also, according to this invention, polymerization or copolymerization can be carried out in the presence of additives to control polymer or copolymer molecular weights. Hydrogen is typically employed for this purpose in a manner well known to persons of skill in the art. Although not usually required, upon completion of polymerization or copolymerization, or when it is desired to terminate polymerization or copolymerization or at least temporarily deactivate the catalyst or catalyst component of this invention, the catalyst can be contacted with water, alcohols, acetone, or other suitable catalyst deactivators in a manner known to persons of skill in the art.

The products produced in accordance with the process of this invention are normally solid, predominantly isotactic polyalpha-olefins. Homopolymer or copolymer yields are sufficiently high relative to the amount of catalyst employed so that useful products can be obtained without separation of catalyst residues. Further, levels of stereorandom by-products are sufficiently low so that useful products can be obtained without separation thereof. The polymeric or copolymeric products produced in the presence of the invented catalyst can be fabricated into useful articles by extrusion, injection molding, thermoforming, and other common techniques.

A propylene polymer made according to this invention primarily contains a high crystalline polymer of propylene. Polymers of propylene having substantial polypropylene crystallinity content now are well-known in the art. It has long been recognized that crystalline propylene polymers, described as "isotactic" polypropylene, contain crystalline domains interspersed with some non-crystalline domains. Noncrystallinity can be due to defects in the regular isotactic polymer chain which prevent perfect polymer crystal formation. The extent of polypropylene stereoregularity in a polymer can be measured by well-known techniques such as isotactic index, crystalline melting temperature, flexural modulus, and, recently by determining the relative percent of meso pentads (% m4) by carbon-13 nuclear magnetic resonance ($^{13}$C NMR).

The propylene polymer especially useful in this invention has both a high nmr tacticity and a broadened molecular weight distribution ("MWD") as measured by the ratio of the weight average to number average molecular weights ($M_w/M_n$). Such molecular weights typically are measured by gel permeation chromatography (GPC) techniques known in the art.

Before heat processing of resulting polymer powder such as in an extruder, radicals or radical generating compounds in the polymer powder should have been stabilized. As used in this invention heat processing refers to heating formed polymer particles to a temperature at which the polymer softens or melts (such as in an extruder) and at such temperature presence of radical species in the polymer normally would cause polymer scission. If such species or compounds have not been completely used in the process, the powder may be further stabilized in a suitable manner, such as contact with radical stabilizing additives known to the art. Compounds preferred for this stabilization are generally referred to as antioxidants. Primary and secondary antioxidants are preferred stabilizers alone or in combination with each other. Examples of such stabilizers include, Irganox 1010 from Ciba-Geigy, Irganox 1076 from Ciba Geigy, Irganox 3114 from Ciba-Geigy, Ultranox 626 from Borg Warner, Cyanox 1790 from American Cyanamide, 2,6-di-t-butyl p-cresol (BHT) from Crompton, N,N'-diphenyl-1,4-phenylene diamine (JZF) from Aldrich, Irgaphos 168 from Ciba-Geigy and Sandostab P-EPQ from Sandoz Chemicals. As used in this invention, radical stabilization or stabilizing radicals means that radical-containing or radical-generating compounds in the polymer formulation no longer are capable of causing polymer chain scission or cross-linking that materially affects polymer properties.

After polymerization, polymer powder is removed from the polymerization reactor by methods known to the art, typically through a separate chamber or blowbox, and preferably transferred to a polymer finishing apparatus in which suitable additives are incorporated into the polymer, which is heated, typically by mechanical shear and added heat, in an extruder to above melt temperature, extruded through a die, and formed into discrete pellets. Before processed by the extruder, polymer powder may be contacted with air and water vapor to deactivate any remaining catalytic species.

This invention is illustrated, but not limited by, the following Examples and Comparative Runs.

EXAMPLES AND COMPARATIVE RUNS

A series of examples and comparative runs of propylene polymerization were conducted in a one U.S. Gallon (3.8-liter) gas-phase, horizontal, cylindrical reactor measuring 10 cm in diameter and 30 cm in length. The reactor was equipped with an off-gas port for recycling reactor gas through a condenser and back through a recycle line to nozzles in the reactor. In the reactor, liquid propylene was used as a quench liquid. The reactor was operated in a continuous fashion. Polymerization was initiated by introduction of high activity supported titanium containing catalyst component produced in accordance with U.S. Pat. Nos. 4,886,022 and 4,946,816. The titanium-containing catalyst component was introduced as a 0.5 to 1.5 wt % slurry in hexane through a liquid propylene-flushed catalyst addition nozzle. A mixture of an organosilane modifier compound (diisopropyldimethoxysilane or diisobutyldimethoxysilane)

and trialkylaluminum co-catalyst in hexane was fed separately to the reactor through a different liquid propylene-flushed addition nozzle. For all polymerizations, an Al/Mg ratio of 6 and an Al/Si ratio of 6 were used. Hydrogen was fed to the reactor at varying rates in order to control powder melt flow rate (MFR). A radical generating compound was added to the reactor as 0.2 up to 3.5 wt % solutions in hexane through a third separate liquid propylene-flushed addition nozzle.

During operation, polypropylene powder was passed over a weir and discharged through a powder discharge system. The polymer bed in the reactor was agitated by paddles attached to a longitudinal shaft within the reactor that was rotated at about 50 rpm. Unless otherwise noted, the reactor temperature and pressure were maintained at 160° F. (71° C.) and 300 psig (2.2 MPa), respectively. Gas composition in the system was monitored through an on-line process gas chromatograph. For random copolymer experiments, ethylene content in the reactor was adjusted to vary the ethylene content in the final polymer. Ethylene content in the gas composition was monitored via the same on-line process gas chromatograph. The production rate was about 200-250 g/hour in order to maintain a stable process.

Polymer stabilization was accomplished by dry blending 0.5 wt. % of the selected primary or secondary antioxidant into the powder.

Xylene Solubles ("XS") were determined by evaporating xylene from an aliquot of the filtrate to recover the amount of soluble polymer produced and are reported as the weight percent (wt. %) of such soluble polymer based on the sum of the weights of the solid polymer supported in the filtration and the soluble polymer. Yield was measured based on magnesium analysis of the polymer. MFR was measured according to ASTM D1238, Condition L (230° C. 2.16 Kg load). Polydispersity (Mw/Mn) was based on gel permeation chromatography data measured using a Waters M150C. The columns (2 in series) were Plgel 10 μm Mixed Bed from Polymer Labs. The column temperature was 139° C. The mobile phase was 1,2,4-trichlorobenzene stabilized with BHT (0.5 g/4 liters) with a flow rate 1.0 ml/min. The detector employed was an RI type. Two injections are made per sample and the reported values are the averages. The instrument was calibrated using a broad polypropylene homopolymer calibration standard. The crystallization temperature (Isf and melting temperature (Tm) were measured on a Perkin-Elmer Pyris-1 DSC tester using methods described in ASTM D-3417 and ASTM D-3418.

Zero Shear Viscosity (ZSV) in Pascal-seconds in a Creep Compliance determination was measured by a Rheometrics SR200 Stress Rheometer at 180° C. Stress (pressure) was held at 1,000 Pa for 60 seconds, then at atmospheric pressure for 120 seconds for a recovery period. Creep compliance test measures the strain changes when a step-stress is applied to polymer melts over a period of time at 180° C. When the stress is removed, the amount of the strain recovered is the recoverable creep compliance, which shows the elasticity of the material with greater recovery indicating higher elasticity. Typically, an increase in zero shear viscosity of a polymer at a given melt flow rate is diagnostic of a long chain branched polymer, if the polymer is sufficiently protected from chain scission through excess peroxide. Conversely, a decrease crossover frequency also is indicative of a long chain branched polymer.

Results of physical testing of the series of propylene polymers prepared as described above are provided in Table 1. These data show preparation of various unmodified and radical-modified polymers with an indication that for comparable tests such modified polymers show an increase in zero shear viscosity. For each Example and Run, data from several polymer discharges from the reactor are averaged in this Table.

TABLE 1

| Ex./Run | RGS[1] | RGS/Ti (molar ratio) | $H_2/C_3$ ($\times 10^{-3}$)[2] | Silane[8] | MFR (g PP/10 min.) | Yield (Kg PP/g-cat) | XS (wt. %) | $M_w/M_n$ | Isf (° C.) | Tm (° C.) | ZSV (Pa·s) |
|---|---|---|---|---|---|---|---|---|---|---|---|
| A | none | 0 | 5.54 | DIBDMS | 4.8 | 27.0 | 1.94 | 6.0 | 110.8 | 160.5 | 2835 |
| B | none | 0 | 8.55 | DIPDMS | 3.2 | 25.6 | 1.17 | 6.5 | 111.5 | 163.1 | 3898 |
| 1 | DTAP | 1 | 9.18 | DIPDMS | 3.4 | 24.9 | 1.22 | 6.3 | 112.2 | 162.7 | 4465 |
| 2 | DTAP | 1 | 4.62 | DIBDMS | 3.3 | 28.6 | 1.75 | 6.2 | 111.3 | 161.2 | 3102 |
| 3 | DTAP | 3 | 5.77 | DIBDMS | 4.3 | 24.3 | 1.92 | 5.6 | 110.8 | 160.9 | 3266 |
| 4 | DTAP | 3 | 8.75 | DIPDMS | 3.4 | 25.2 | 1.25 | 6.1 | 112.3 | 162.4 | 4122 |
| 5 | DTAP | 10 | 7.9 | DIPDMS | 2.5 | 20.9 | 1.20 | 6.6 | 112 | 163.0 | 13020 |
| 6 | DTAP | 10 | 5.56 | DIBDMS | 3.5 | 20.4 | 1.84 | 6.2 | 110.8 | 161.5 | 10150 |
| C | none | 0 | 10.08 | DIPDMS | 3.2 | 16.4 | 1.30 | 6.7 | 113.5 | 162.8 | |
| 7 | DTAP | 5 | 9.66 | DIPDMS | 3.3 | 18.6 | 1.28 | 6.6 | 113.5 | 162.7 | 15500 |
| 8 | DTAP | 10 | 12.25 | DIPDMS | 2.9 | 16.1 | 1.21 | 6.7 | 113.7 | 162.6 | 17900 |
| 9 | DTAP | 20 | 10.02 | DIPDMS | 2.1 | 11.1 | 1.14 | 6.6 | 113.5 | 162.8 | 24000 |
| 10 | DTAP | 40 | 10.05 | DIPDMS | 2.3 | 3.7 | 1.37 | 7.2 | 114 | 163.0 | 16100 |
| 11* | DTAP | 10[2] | 9.78 | DIPDMS | 2.6 | 16.0 | 1.25 | 7.0 | 113.5 | 162.6 | 20500 |
| 12* | DTAP | 10[3] | 10.72 | DIPDMS | 4.0 | 13.7 | 1.04 | 6.4 | 113.6 | 162.1 | 13400 |
| 13* | DTAP | 10[4] | 10.26 | DIPDMS | 8.6 | 8.7 | 1.24 | 6.0 | 114 | 162.7 | 6001 |
| 14* | DTAP | 10 | 12.16 | DIPDMS | 2.8 | 21.1 | 5.50 | 6.8 | 97.9 | 144.0 | |
| D* | none | 0 | 12.62 | DIPDMS | 2.8 | 26.9 | 5.30 | 6.7 | 98.1 | 143.4 | |
| 15* | DTAP | 10 | 11.26 | DIPDMS | 2.1 | 18.9 | 5.00 | 6.8 | 99.1 | 145.2 | |
| E | none | 0 | 12.33 | DIPDMS | 3.8 | 17.9 | 1.28 | 6.0 | 113.9 | 162.0 | |
| 16 | DDBH | 10 | 11.08 | DIPDMS | 2.5 | 11.0 | 1.36 | 6.1 | 115.1 | 162.7 | 20,100 |
| 17 | DDBH | 10[2] | 12.58 | DIPDMS | 2.7 | 13.3 | 1.62 | 7.4 | 114.5 | 162.5 | 20,000 |
| 18 | TBEC | 10[2] | 12.89 | DIPDMS | 3.2 | 13.1 | 1.66 | 7.3 | 114.5 | 162.2 | 18,900 |
| 19 | TBEC | 10 | 11.75 | DIPDMS | 3.2 | 15.5 | 1.28 | 6.9 | 114.4 | 163.0 | 15,900 |
| 20[5] | ABIN | 10 | 12.29 | DIPDMS | 4.4 | 7.3 | 1.00 | 7.2 | | | 11,300 |
| 21[6] | ABIN | 3 | 12.1 | DIPDMS | 3.7 | 10.2 | 0.90 | 7.1 | | | 13,800 |
| 22[7] | ABIN | 3[2] | 12.29 | DIPDMS | 2.5 | 9.7 | 1.03 | 7.8 | | | 20,700 |

TABLE 1-continued

| Ex./Run | RGS[1] | RGS/Ti (molar ratio) | $H_2/C_3$ (×10$^{-3}$) | Silane[8] | MFR (g PP/10 min.) | Yield (Kg PP/g-cat) | XS (wt. %) | $M_w/M_n$ | Isf (° C.) | Tm (° C.) | ZSV (Pa · s) |
|---|---|---|---|---|---|---|---|---|---|---|---|
| 23 | DTAP | 10 | 10.35 | DIP/TNHA | 3.2 | | | | | | |
| 24 | DTAP | 10 | 10.05 | DIP/TMA | 3.0 | | | | | | |

[1]DTAP = di-tert-amylperoxide; DDBH = 2,5-dimethyl-2,5-di(t-butylperoxy)-3-hexyne; TBEC = t-butylperoxy-2-ethyl-hexylcarbonate; ABIN = 2,2'-Azobis(isobutyronitrile)
[2]Polymerization Temperature = 140° F. (60° C.).
[3]Polymerization Temperature = 180° F.(71° C.).
[4]Polymerization Temperature = 200° F.(93° C.).
[5]Random Copolymer, 3.25 wt. % ethylene
[6]Random Copolymer, 3.3 wt. % ethylene
[7]Random Copolymer, 2.7 wt. % ethylene
[8]DIPDMS = diisopropyldimethoxysilane; DIBDMS = diisobutyldimethoxysilane; DIP/TNHA = DIPDMS/Tri-n-hexyl aluminum; DIP/TMA = DIPDMS/Trimethylaluminum Melt strength defined as the resistance of a melt to a draw-down may be measured directly using a Göttfert Rheotens® instrument. This device measures the extensional properties of polymer melts by drawing a vertical melt strand at a constant pull-off speed or with a linearly or exponentially accelerating velocity. The Rheotens® instrument measures the forces needed to elongate the strand and calculates elongational stress, draw ratios, rate of elongation, and elongational viscosity. Tensile force of a melt is reported in centinewtons (cN) and tensile stress is reported in pascals. Polymers of Examples 5 and 6 together with Comparative Run A were tested using a Rheotens® instrument operating at 180° C., with strand acceleration set at 60 mm/s, velocity@die (Vo) 10.4 mm/sec, strand length 109.0 mm, and strand velocity (Vs) 5.9 mm/s. Resulting data are shown in Table 2.

TABLE 2

| Ex. (Run) | Crossover Frequency (rad/sec) | Crossover Modulus (Pa) | Tensile Force (cN) | Elongation Ratio (Vb/Vs) | Tensile Stress (kPa) |
|---|---|---|---|---|---|
| A | 22.9 | 24,857 | 8.85 | 12.84 | 187 |
| 5 | 13.4 | 23,974 | 11.48 | 15.33 | 324 |
| 6 | 15.3 | 24,238 | 11.27 | 15.65 | 359 |

The data show an increase of Tensile Force and Tensile Stress for propylene polymers modified according to this invention.

What is claimed is:

1. An olefin polymerization process comprising gas-phase polymerization of at least one olefin monomer in a reactor using a Ziegler-Natta or metallocene catalyst system in the presence of at least one suitable radical-generating compound in an amount sufficient for polymer modification and subsequent stabilization of such radicals before post-reactor heat processing wherein the generated radical is formed from di-tert-amylperoxide, t-butylperoxy-2-ethoxyhexylcarbonate, 2,5-dimethyl-2,5-di(t-butylperoxy)-3-hexyne, di-tert-butyl peroxide; tert-butyl cumyl peroxide; tert-amylperoxy benzoate;. tert-butylperoxy-3,5,5-trimethylhexanoate; tertbutylperoxy-2-ethylhexanoate: tert-amylperoxy-2-ethylhexanoate; a mixture of peroxydicarbonates; 2,5-bis(tert-butylperoxy)-2,5-dimethylhexane; dicumyl peroxide; 2,2-di(tert-butylperoxy)butane; tert-amylperoxy-2-ethylhexylcarbonate; or tertbutylperoxy-2-ethylhexylcarbonate.

2. An olefin polymerization process comprising gas-phase polymerization of at least one olefin monomer in a reactor using a Ziegler-Natta or metallocene catalyst system in the presence of at least one suitable radical-generating compound in an amount sufficient for polymer modification and subsequent stabilization of such radicals before post-reactor heat processing wherein the generated radical is formed from an azo compound.

3. A process of claim 2 wherein at least one olefin monomer comprises a $C_2$-$C_{14}$ olefin monomer.

4. A process of claim 2 wherein at least one olefin monomer comprises propylene, ethylene, or a mixture thereof.

5. A process of claim 2 wherein the olefin monomer is propylene monomer.

6. A process of claim 2 in which the generated radical has a lifetime sufficient to permit reaction with a forming polymer chain within the reactor.

7. An olefin polymerization process comprising:
   a) introducing into a polymerization reactor
      (i) at least one $C_2$-$C_8$ alpha-olefin monomer,
      (ii) a Ziegler-Natta or metallocene olefin polymerization catalyst component containing a transition metal,
      (iii) at least one co-catalyst component; and
      (iv) at least one compound which generates radicals sufficient to modify polymer formed in the process in which the generated radical has a half life greater of at least one hour and a $T_h$ greater than 75° C. and wherein the generated radical is formed from di-tert-amylperoxide, t-butylperoxy-2-ethoxyhexylcarbonate, 2,5-dimethyl-2,5-di(t-butylperoxy)-3-hexyne, di-tert-butyl peroxide; tert-butyl cumyl peroxide; tert-amylperoxy benzoate; tert-butylperoxy-3,5,5-trimethylhexanoate; tertbutylperoxy-2-ethylhexanoate; tert-amylperoxy-2-ethylhexanoate; a mixture of peroxy dicarbonates; 2,5-bis(tert-butylperoxy)-2,5-dimethylhexane; dicumyl peroxide; 2,2-di(tert-butylperoxy)butane; tert-amylperoxy-2-ethylhexylcarbonate; or tertbutylperoxy-2-ethylhexylcarbonate;
   b) polymerizing the olefin monomers under gas-phase polymerization conditions;
   c) recovering the resulting polymer; and
   d) stabilizing the radical-generating compound and generated radicals prior to post-reactor polymer heating.

8. A process of claim 7 wherein the monomer is propylene, ethylene, or a mixture thereof.

9. A process of claim 7 in which two or more polymerization reactors are used in series and the radical-generating compound is added to at least one reactor.

10. A process of claim 7 in which the radical-generating compound is di-tertamylperoxide, t-butylperoxy-2-ethoxy-hexylcarbonate, or 2,5-dimethyl-2,5-di(tbutylperoxy)-3-hexyne.

11. A process of claim 7 in which the radio of molar amount of radical-generating compound to atomic amount transition metal in the catalyst is greater than 0.01.

12. A process of claim 7 wherein the polymerization catalyst system is a Ziegler-Natta system.

13. A process of claim 7 wherein the polymerization catalyst system is a metallocene system.

14. A process of claim 7 wherein the polymerization reactor is a gas-phase horizontal, stirred-bed reactor.

15. A process of claim 7 in which stabilization of the radical-generating compound and generated radicals is accomplished by selecting the amount of radical-generating compound introduced such that the radical-generating compound and generated radicals are used completely during the process.

* * * * *